US006487864B1

(12) United States Patent
Platt et al.

(10) Patent No.: US 6,487,864 B1
(45) Date of Patent: Dec. 3, 2002

(54) CYROGENIC INERTIAL MICRO-ELECTRO-MECHANICAL SYSTEM (MEMS) DEVICE

(75) Inventors: William P. Platt, Columbia Heights, MN (US); Burgess R. Johnson, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/127,976

(22) Filed: Apr. 23, 2002

(51) Int. Cl.[7] .................................................. F25B 21/02
(52) U.S. Cl. ................................... 62/3.2; 62/51.1
(58) Field of Search ............................ 62/3.2, 3.6, 3.7, 62/259.2, 51.1

(56) References Cited

U.S. PATENT DOCUMENTS

| | | | |
|---|---|---|---|
| 5,505,084 A | 4/1996 | Greiff et al. | 73/504.14 |
| 5,992,233 A | 11/1999 | Clark | 73/514.35 |
| 6,074,890 A | * 6/2000 | Yao et al. | 438/52 |
| 6,257,059 B1 | 7/2001 | Weinberg et al. | 73/504.16 |
| 6,314,887 B1 | * 11/2001 | Robinson et al. | 102/262 |
| 6,347,237 B1 | 2/2002 | Eden et al. | 505/210 |
| 6,385,973 B1 | * 5/2002 | Moran | 60/520 |
| 6,428,713 B1 | * 8/2002 | Christenson et al. | 216/2 |

OTHER PUBLICATIONS

Shcheglov et al., "Temperature Dependent Characteristics of the JPL Silicon MEMS Gyroscope," Proceedings of the 2000 IEEE Aerospace Conference, Big Sky, MT, vol. 1, pp 403–411, Mar. 2000.

Grassia et al., "Quantum theory of fluctuations in a cold damped accelerometer," *The European Physical Journal D*, 8:101–110 (2000).

* cited by examiner

Primary Examiner—Denise L. Esquivel
Assistant Examiner—Melvin Jones
(74) Attorney, Agent, or Firm—Dennis C. Bremer (57) ABSTRACT

A cryogenic inertial Micro-Electro-Mechanical System (MEMS) device is provided. The device may include a vibratory gyroscope operable to sense a rotational acceleration. The device may also include a pre-amplifier co-located in a close proximity to the vibratory gyroscope. The device may be operated at substantially low temperatures, such as cryogenic temperatures, to reduce electrical noise and improve stability of outputs of the system.

39 Claims, 7 Drawing Sheets

CYROGENIC INERTIAL MICRO-ELECTRO-MECHANICAL SYSTEM (MEMS) DEVICE

BACKGROUND

A. Field of Invention

The present invention relates to MEMS devices, and more particularly, to cryogenic inertial MEMS devices.

B. Description of Related Art

Micro mechanics, micro-machines, or more commonly, Micro-Electro-Mechanical Systems (MEMS) are an integration of mechanical elements, such as sensors and actuators, and/or electronics on a common substrate through the utilization of micro-fabrication technology. While the electronics are fabricated using Integrated Circuit (IC) process sequences (e.g., CMOS, Bipolar, or BICMOS processes), micro-mechanical components are fabricated using compatible "micro-machining" processes that selectively etch away parts of a silicon wafer or add new structural layers to form mechanical and electromechanical devices.

Micro mechanical sensors include a mechanical structure and a sensing device. The mechanical structure is typically deformed and the sensing device transforms the deformation into an electrical signal. The mechanical structure deformation depends upon the shape of the structure, and also on the mechanical properties of the structure, such as Young's Modulus, the Poisson ratio, and mechanical load distribution. Furthermore, environmental parameters, such as pressure, temperature, humidity, acceleration, rotation, etc., dictate a deformation of the mechanical structure. Mechanical properties and environmental parameters such as these can largely affect operation of a MEMS device due to a small size and shape of the MEMS device.

The sensing device within micro mechanical sensors may include electrically conducting bodies in close proximity with each other. Altering an arrangement of the electrically conducting bodies causes a change in capacitance that can be detected by a variation in voltage. Alternatively, MEMS devices may also operate based on temperature and heat conduction effects. Two metal plates may be placed in close proximity to each other and a heat transfer through a medium in a gap between the plates can be measured by a temperature resistance effect observed on the plates. Thus, methods of operation can be affected due to inherent electrical and mechanical properties of a MEMS.

MEMS operation presents obstacles due to these challenges present within the micro-machine domain. Empirical laws known to be true but insignificant at a macro level can be significant at a micro level. For example, a typical electrical conductor, such as gold, includes intrinsic electronic noise, which leads to inherent resistance, which can dominate operation of MEMS.

MEMS devices also include intrinsic fluctuations of operation due to thermal dynamical properties of the MEMS. For example, in operation of vibratory MEMS, such as a MEMS tuning fork gyroscope, the performance of the MEMS may be limited due to physical limitations of materials used within the MEMS, such as electrical conductors. For instance, Johnson noise (e.g., thermal noise) may be present within electrical conductors. Johnson noise is an inherent property among electrical conductors because it is substantially always present due to a random thermal motion of electrons. The Johnson noise power per unit bandwidth is proportional to absolute temperature and is independent of frequency, therefore operation of a MEMS at higher temperatures induces a larger Johnson noise. In addition, typical operation of a MEMS may be affected due to the Seebeck effect. The Seebeck effect produces a voltage between dissimilar conducting materials in the presence of a non-uniform temperature. In this situation, fluctuations in the temperature can produce voltage noise in MEMS devices. Finally, Brownian motion is present in substantially all devices due to fluctuating thermal mechanical forces. In devices with a small mass, such as MEMS devices, Brownian motion is especially significant. Brownian motion is a fundamental limitation to the ability to measure the position of a MEMS device. For example, the output of a MEMS gyroscope or MEMS accelerometer is determined by measuring the distance between two capacitor plates, at least one of which is located on the MEMS device.

Consequently, typical operation of a MEMS may be limited by inherent mechanical and electrical properties. As such, existing MEMS may not be able to meet manufacturing requirements and/or desired applications of MEMS. Thus, it would be desirable to provide a MEMS device that is able to overcome inherent mechanical and electrical property limitations.

SUMMARY

In view of the above, some of the problems within MEMS operation associated with thermal and mechanical noise are overcome. In an exemplary embodiment, a method of operating an inertial Micro-Electro-Mechanical System (MEMS) device at a cryogenic temperature is provided. The inertial MEMS device may include cryogenic and/or super conducting materials to enhance operation at cryogenic temperatures. In addition, a method of operating an inertial Micro-Electro-Mechanical-System (MEMS) device is provided by providing a housing and an inertial MEMS device coupled to a pre-amplifier. The method further includes co-locating the inertial MEMS device and the pre-amplifier within a close proximity of the housing and operating the inertial MEMS device at cryogenic temperatures.

These as well as other features and advantages of the present invention will become apparent to those of ordinary skill in the art by reading the following detailed description, with appropriate reference to the accompanying drawings.

BRIEF DESCRIPTION OF FIGURES

Presently preferred embodiments of the invention are described below in conjunction with appended drawing figures, wherein like reference numerals refer to like elements in the various figures, and wherein.

DETAILED DESCRIPTION OF EXEMPLARY EMBODIMENTS

Figure 1:
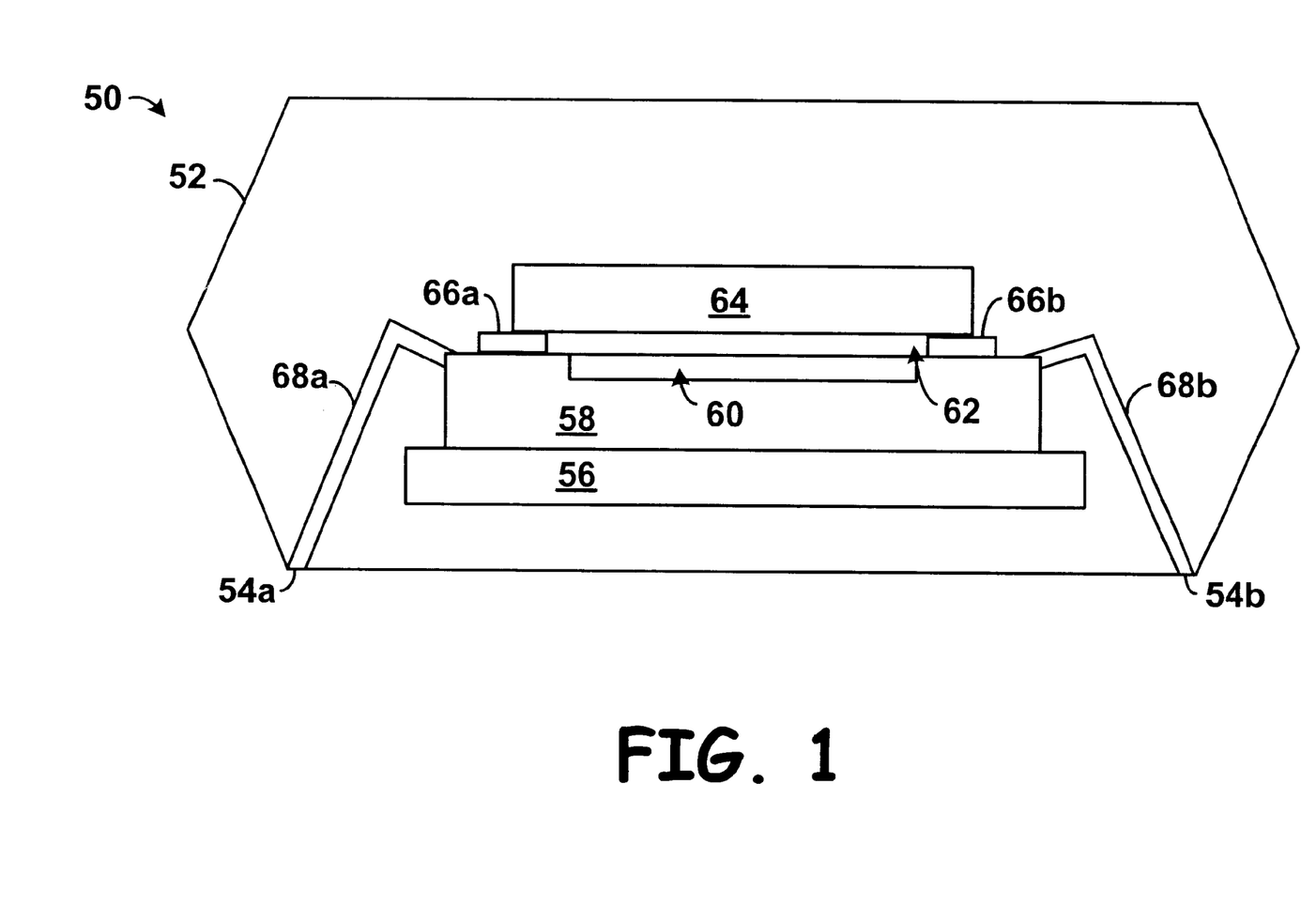
FIG. 1 illustrates one embodiment of a MEMS.

FIG. 1 illustrates one embodiment of a Micro-Electro-Mechanical System (MEMS) 50. While FIG. 1 illustrates MEMS 50, other inertial MEMS devices or sensors may be employed as well. For example, a MEMS gyroscope, which uses a Coriolis acceleration to detect rotation, such as an angular rate-sensing gyroscope, may be used. In addition, it should be understood that the MEMS 50 illustrated in FIG. 1 and other arrangements described herein are set forth for purposes of example only, and other arrangements and elements can be used instead and some elements may be omitted altogether, depending on manufacturing and/or consumer preferences.

By way of example, MEMS 50 has a housing such as a molded plastic package 52 having y multiple electrical contacts 54(a–b). A substrate 56 is present at or near the base of the MEMS 50 within the plastic package 52. A micro-machine chip 58 is coupled to the substrate 56. The micro-machine chip 58 has a micro-machine 60. A cover 64 is coupled to the micro-machine chip 58 using multiple bonds 66(a–b). The cover 64 may be coupled to the micro-machine chip 58 in a manner such that open space 62 remains between the cover 64 and the micro-machine 60. Leads 68(a–b) are present to electrically couple the micro-machine chip 58 to the electrical contacts 54(a–b).

MEMS 50 illustrated in FIG. 1 may comprise more or fewer components than described. For instance, two electrical contacts 54(a–b) have been illustrated, although those skilled in the art will recognize that a MEMS may have other numbers of contacts and/or extruding pins as well. Additionally, more or fewer members may be present in the MEMS 50 other than the substrate 56, the micro-machine chip 58, the micro-machine 60, and the cover 64. Furthermore, members of the MEMS 50 may have multiple functions. For instance, in one embodiment, the micro-machine 60 is a tuning fork gyroscope operable to perform electrical and mechanical operations. Still other operations are possible as well.

The cover 64 of the MEMS 50 may be comprised of a material such as silicon, glass or a ceramic material. The cover 64 has a cavity which allows open space 62 between the cover 64 and the micro-machine 60 providing components of the micro-machine 60 the ability to move freely. For example, a proof mass may be movably coupled to the micro-machine chip 58 and the proof mass may oscillate within the open space 62 provided. The micro-machine 60 may be any such electromechanical machine used in accordance with MEMS and MEMS-based devices. In addition, alternate packages may be used as well to provide a housing for the MEMS 50. For example, a Leadless Ceramic Chip Carrier (LCCC) package may be used instead of the plastic package 52 illustrated in FIG. 1.

Figure 2:
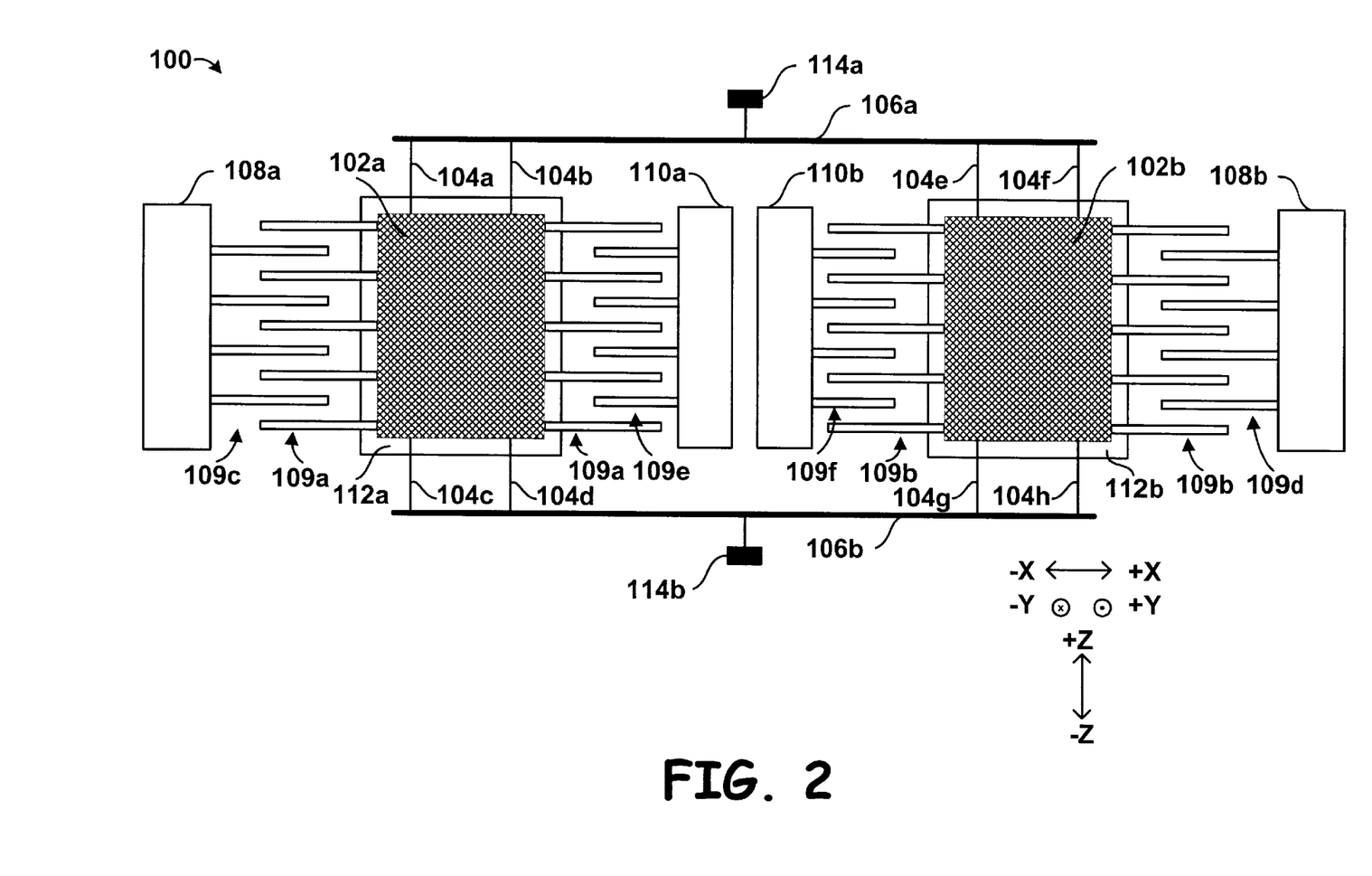
FIG. 2 illustrates one embodiment of an inertial MEMS device.

FIG. 2 illustrates one embodiment of an inertial Micro-Electro-Mechanical System (MEMS) device. FIG. 2 illustrates the inertial MEMS device as a MEMS Tuning Fork Gyroscope (TFG) 100. MEMS TFG 100 may be formed on a substrate and has multiple proof masses 102(a–b), a plurality of support beams 104(a–h), multiple cross beams 106(a–b), multiple motor drive combs 108(a–b), multiple motor pickoff combs 110(a–b), multiple sense plates 112(a–b), and multiple anchors 114(a–b). Although FIG. 2 illustrates MEMS TFG 100 with two proof masses 102(a–b) with associated multiple components, it will be understood by those of skill in the art that any number of proof masses and associated components may be used within the MEMS TFG 100.

Proof masses 102(a–b) may be any mass suitable for use in a MEMS gyroscope. In one embodiment, proof masses 102(a–b) are plates of silicon. Other materials that are compatible with micro-machining processes may also be employed. Proof masses 102(a–b) are located substantially between motor drive combs 108(a–b) and motor pickoff combs 110(a–b). Proof masses 102(a–b) include a plurality of comb-like electrodes 109(a–b) extending from the proof masses 102(a–b) towards both the motor drive combs 108(a–b) and the motor pickoff combs 110(a–b).

In addition, both the motor drive combs 108(a–b) and the motor pickoff combs 110(a–b) may include electrodes 109 (c–d) and 109(e–f) extending from both the motor drive combs 108(a–b) and the motor pickoff combs 110(a–b) toward the proof masses 102(a–b). The number of the electrodes on the motor drive combs 108(a–b) and the motor pickoff combs 110(a–b) may be determined by the number of electrodes on the proof masses 102(a–b). Although ten electrodes W, are shown extending from each of the proof masses 102(a–b) in FIG. 2 for ease of illustration, any desirable number of electrodes may be used with proof masses 102(a–b), motor drive combs 108(a–b), or the motor pickoff combs 110(a–b) within the MEMS TFG 100. Likewise, electrodes 109(a–f) may be arranged or located in different positions.

Proof masses 102(a–b) are supported above the sense plates 112(a–b) by the plurality of support beams 104(a–h). While eight support beams 104(a–h) are depicted in FIG. 2, the number of support beams used may be more or less than eight. The plurality of support beams 104(a–h) may be micro-machined from a silicon wafer. The plurality of support beams 104(a–h) enable the proof masses 102(a–b) to move within a drive plane and a sense plane. The drive plane and the sense plane are illustrated within FIG. 2 as the X-axis and the Y-axis of the Cartesian coordinate system. (See FIG. 2 Cartesian coordinate system configuration).

Support beams 104(a–b) and 104(e–f) are connected to cross beam 106a. Support beams 104(c–d) and 104(g–h) are connected to cross beam 106b. The cross beams 106(a–b) are connected to anchors 114(a–b) which provide support for the MEMS TFG 100. The anchors 114(a–b) are connected to an underlying substrate within the MEMS TFG 100. While two anchors 114(a–b) are depicted in FIG. 2, the number of anchors may be more or less than two. The anchors 114(a–b) may be positioned along the cross beams 106(a–b) in any manner that provides support for the MEMS TFG 100.

The plurality of comb-like electrodes 109(a–d) of the proof masses 102(a–b) and the motor drive combs 108(a–b) form capacitors. The motor drive combs 108(a–b) may be connected to drive electronics (not shown in FIG. 2). The motor drive combs 108(a–b) and the motor pickoff combs 110(a–b) may initiate an oscillation motion and/or vibratory motion of the proof masses 102(a–b) along the drive plane (X-axis). The drive electronics may enable the w proof masses 102(a–b) to oscillate at a substantially tuning fork frequency along the drive plane (X-axis) by using the capacitors formed by the plurality of comb-like electrodes 109(a–d) of the proof masses 102(a–b) and the motor drive combs 108(a–b). In addition, the plurality of comb-like electrodes 109(a–b) and 109(e–f) of the motor pickoff combs 110(a–b) form capacitors, which may allow the MEMS TFG 100 to sense motion in the drive plane (X-axis).

The sense plates 112(a–b) form parallel plate capacitors with the proof masses 102(a–b). The MEMS TFG 100 can detect a change in an angular rate of motion of the proof masses 102(a–b). The change in the angular rate of motion may be detected from a change in capacitance of the proof mass 102(a–b) and sense plate 112(a–b) parallel plate capacitors formed in the sense plane (Y-axis). The change in angular rate of motion may be due to an applied Coriolis force to the MEMS TFG 100 along the input plane (Z-axis).

In one embodiment, MEMS TFG 100 operates by exciting or vibrating the proof masses 102(a–b) along the X-axis by the motor drive combs 108(a–b). The motor drive combs 108(a–b) may use electrostatic forces between the plurality of comb-like electrodes 109(a–b) of the proof masses 102 (a–b) and the comb-like electrodes 109(c–d) of the motor drive combs 108(a–b) to oscillate and/or vibrate the proof masses 102(a–b). A force can then be applied to the MEMS TFG 100, which excites a secondary vibration of the proof masses 102(a–b) along the Y-axis. The force may be a Coriolis force applied to the proof masses 102(a–b) when the MEMS TFG 100 is in a rotating frame of reference, the rotation being along the Z-axis. The force may cause the proof masses 102(a–b) to temporarily oscillate along the sense plane (Y-axis).

The temporary oscillation of the proof masses 102(a–b) along the Y-axis may be a force substantially normal to the MEMS TFG 100 oscillation (i.e., vibratory direction) and Coriolis force (i.e., angular rotation direction). A resulting movement of the proof masses 102(a–b) occurs due to the temporary oscillation along the Y-axis, and the resulting movement is measured capacitively by a change in capacitance of the proof mass 102(a–b) and sense plate 112(a–b) parallel capacitors. The change in the capacitance can be related to a change in the angular rate of motion of the MEMS TFG 100.

An output of the MEMS TFG 100 may be a voltage signal proportional to the change in capacitance. The sense plates 112(a–b) may be connected to sense electronics (not shown in FIG. 2). The sense electronics may detect the change in capacitance as the proof masses 102(a–b) move towards and/or away from the sense plates 112(a–b). The sense electronics may also detect small amplitude changes induced by a rotation and/or other additional changes of motion of the proof masses 102(a–b).

Figure 3A:
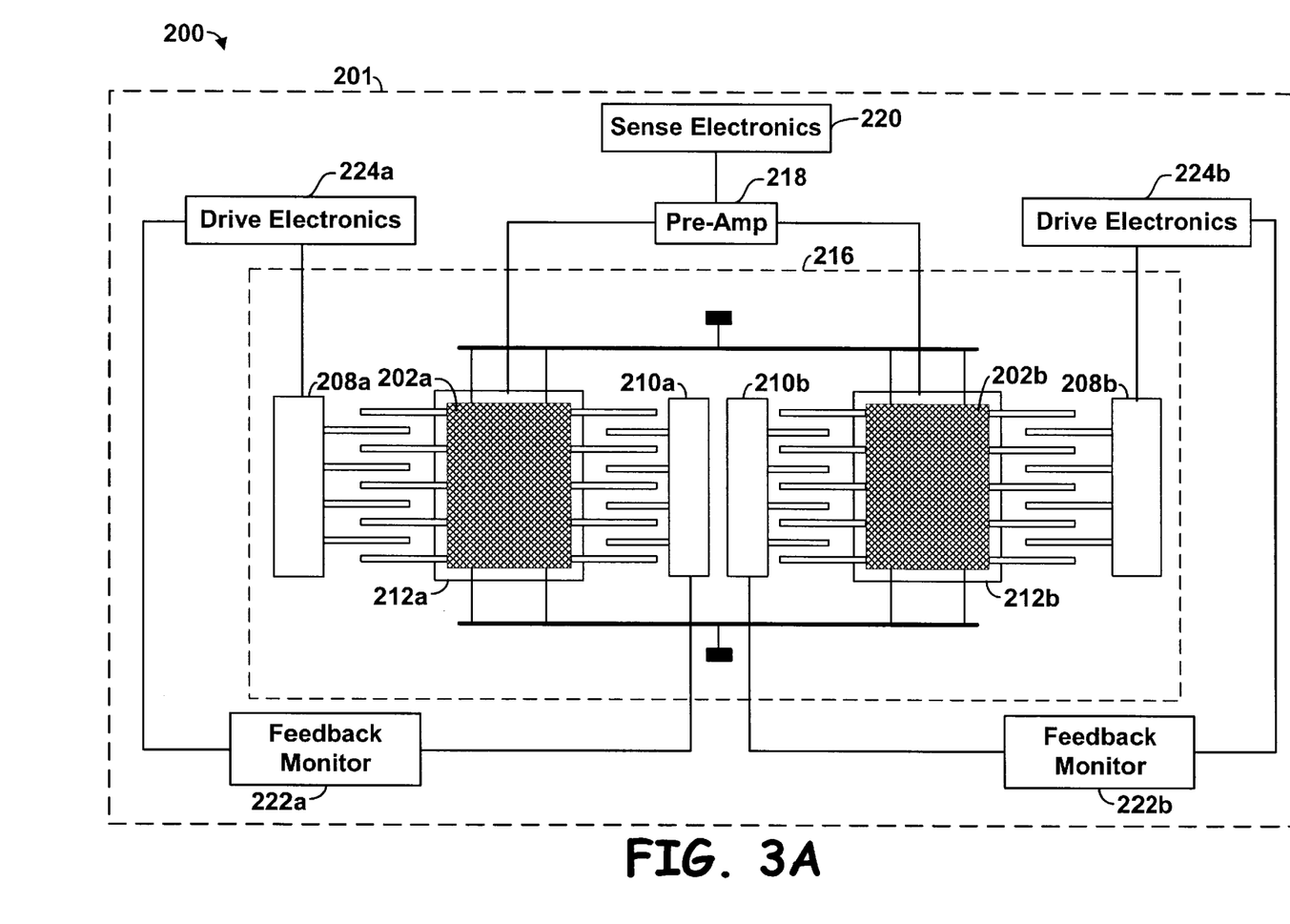
FIG. 3A illustrates one embodiment of an inertial MEMS system.

FIG. 3A illustrates one embodiment of an inertial MEMS system. The inertial MEMS system of FIG. 3A is illustrated as a MEMS gyroscope 200. The MEMS gyroscope 200 may include a housing 201 that includes a Tuning Fork Gyroscope (TFG) 216, which may be substantially the same as MEMS TFG 100 as depicted in FIG. 2. The housing may be a plastic package similar to the plastic package 52 of MEMS 50 illustrated in FIG. 1. The housing may also be a small outline integrated circuit (SOIC) package, a plastic leaded chip carrier (PLCC) package, a quad flat package (QFP), or other. The housing may provide a structure to co-locate elements of the TFG 216 and/or locate elements within a close proximity of each other within the housing 201. A separate housing (not shown) may also be included within the MEMS gyroscope 200 to provide separation between sensitive elements of the TFG 216 or the MEMS gyroscope 200.

In one embodiment, the TFG 216 may include proof masses 202(a–b), motor drive combs 208(a–b), motor pickoff combs 210(a–b), and sense plates 212(a–b). A pre-amplifier 218 may be included within the housing 201 and may be electrically connected or coupled to each of the proof mass 202(a–b) and/or sense plate 212(a–b) combinations. The pre-amplifier 218 and the TFG 216 may both be formed on a common substrate and may be electrically connected through traces of the substrate, or the pre-amplifier 218 and the TFG 216 may be separate elements connected by wires or other electrical connections.

In another embodiment, the pre-amplifier 218 may be connected to the proof masses 202(a–b), either electrically, optically, or by other means, and may be within a close proximity of the housing 201. For instance, the pre-amplifier 218 may be included within a separate housing attached to the housing 201 or generally located adjacent the housing 201 so that the pre-amplifier 218 and the housing 201 of the TFG 216 are within a common system, such as the MEMS gyroscope 200.

An output of the pre-amplifier 218 may be sent to sense electronics 220. In another embodiment, the pre-amplifier 218 may be incorporated within the sense electronics 220. The sense electronics 220 may be located within the housing 201 as well, or the sense electronics 220 may be located within a separate housing that is within a common system of the TFG 216.

In addition, an output of the motor pickoff combs 210(a–b) is transferred to feedback monitors 222(a–b). The feedback monitors 222(a–b) output signals to the drive electronics 224(a–b), which power the motor drive combs 208(a–b). Alternatively, the feedback monitors 222(a–b) may be incorporated within the drive electronics 224(a–b). The MEMS gyroscope may also include a system power source and other operational electronics, which are not shown in FIG. 3A for ease of illustration.

The motor drive combs 208(a–b) may operate in a drive mode of the MEMS gyroscope 200 by exciting the proof masses 202(a–b) using electrostatic forces by applying a voltage to electrodes of the proof masses 202(a–b). The motor pickoff combs 210(a–b) monitor the excitation or oscillation of the proof masses 202(a–b) by monitoring voltage signals on electrodes on the proof masses 202(a–b). The motor pickoff combs 21 0(a–b) output a feedback signal to the feedback monitor 222(a–b). The feedback monitor 222(a–b) provides an input to the drive electronics 224 (a–b). If the proof masses 202(a–b) begin to oscillate too fast or too slow, the drive electronics 224(a–b) may adjust the oscillation frequency such that the proof masses vibrate at a resonant frequency. Excitation at such a frequency may enable a higher amplitude output signal to be generated.

Figure 3B:
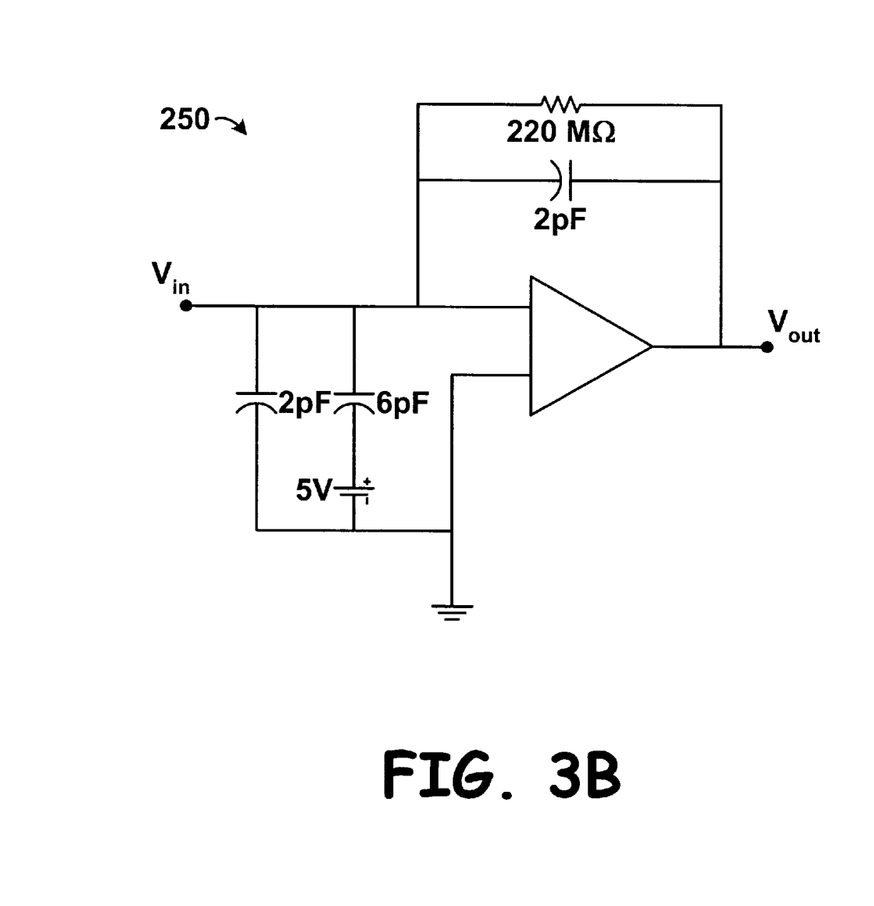
FIG. 3B illustrates one embodiment of a pre-amplifier.
Figure 3C:
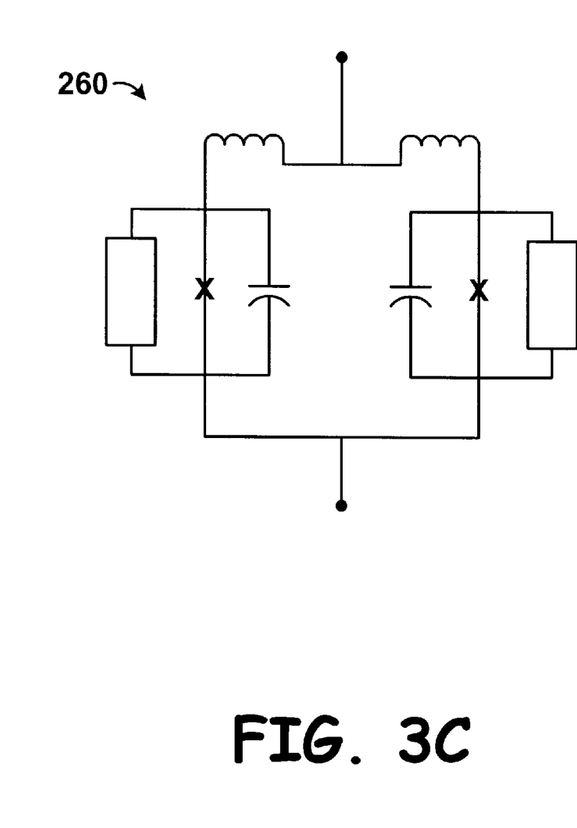
FIG. 3C illustrates another embodiment of a pre-amplifier.

The pre-amplifier 218 of MEMS gyroscope 200 converts a change in capacitance of the proof mass 202(a–b) and sense plate 212(a–b) capacitors to an output voltage signal. The pre-amplifier 218 may also increase a magnitude of the capacitance signals from the proof mass 202(a–b) and sense plate 212(a–b) capacitors. FIG. 3B illustrates one embodiment of a pre-amplifier 250. The pre-amplifier 250 illustrated in FIG. 3B is a Charge Amplifier (CHAMP). Example capacitance, resistance, and voltage values that have been found of particular use are illustrated for elements of the pre-amplifier 250. FIG. 3C illustrates an alternative embodiment of a pre-amplifier 260. FIG. 3C illustrates a super conducting quantum interference device amplifier (SQUID Amp). The pre-amplifier 260 includes inductors and capacitors coupled through Josephson junctions as illustrated in FIG. 3C.

The sense electronics 220 may operate in a sense mode within the MEMS gyroscope 200 and may convert the output voltage signal from the pre-amplifier 218 from an alternating current (AC) to a direct current (DC) signal. The sense electronics 220 may also detect a change in the capacitance of the proof mass 202(a–b) and sense plate 212(a–b) capacitors according to the output voltage signal generated by pre-amplifier 218 and relate this change in capacitance to an amount of change in an angular rate of motion of the MEMS gyroscope 200. The amount of change in the angular rate may be due to a Coriolis force or Coriolis acceleration. The amplitude of the Coriolis acceleration ($a_{Coriolis}$) may be determined using Equation 1 (Eq. 1) provided below.

$$a_{Coriolis} = 2\Omega^* v \qquad \text{Eq. 1}$$

Where $\Omega$ is a rotational frequency and v is the velocity of the oscillation of the proof masses 202(a–b).

Figure 4:
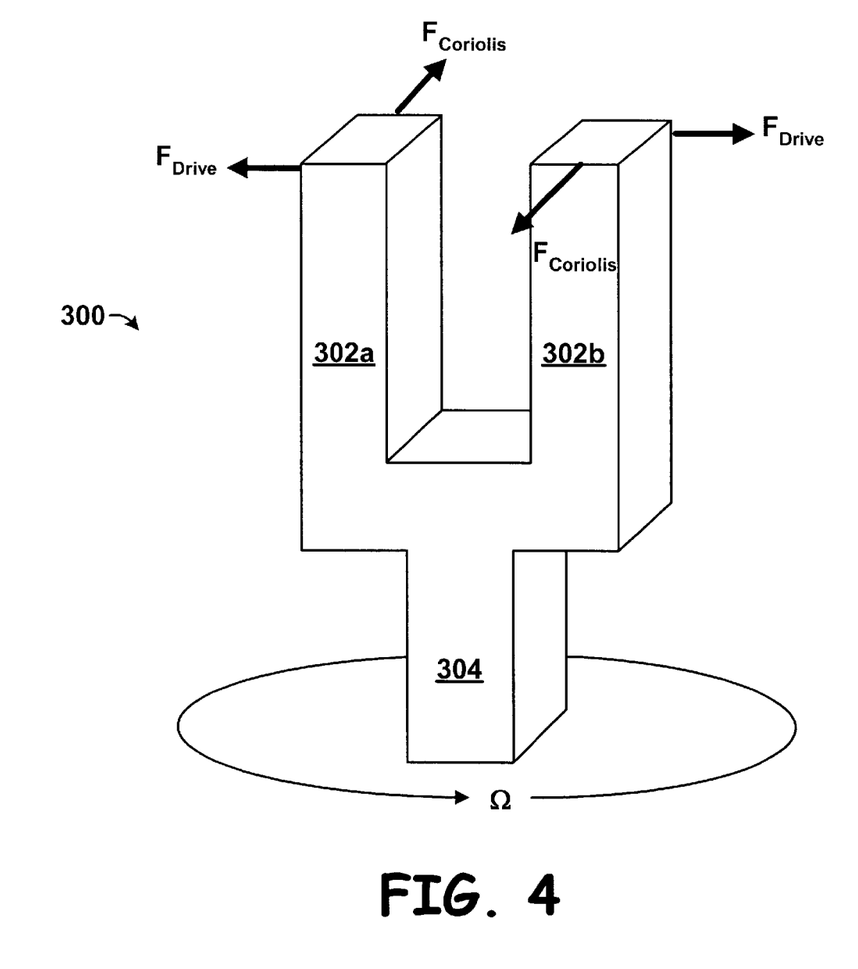
FIG. 4 illustrates a conceptual tuning fork angular rate sensor.

FIG. 4 illustrates a conceptual tuning fork angular rate sensor 300. Tines 302(a–b) of the tuning fork angular rate sensor 300 are driven differentially and at a constant amplitude indicated by $F_{Drive}$ arrows. A rotation of stem 304 (indicated by $\Omega$ arrow) of the tuning fork angular rate sensor 300 results in a Coriolis acceleration of the tines 302(a–b) in a direction (indicated by $F_{Coriolis}$ arrows) perpendicular to the drive direction. The Coriolis force can be detected from the bending of the tines 302(a–b) or from a torsional vibration of the stem 304. Actuation of the oscillation of the tines 302(a–b) can be electro-static, piezo-electric or electromagnetic whereas the sensing of the Coriolis force can be capacitive, piezo-resistive or piezo-electric.

FIG. 4 conceptually illustrates operation of the MEMS TFG 100 and MEMS gyroscope 200. The proof masses 202(a–b) of the MEMS gyroscope 200 may be driven differentially in a manner similar to the oscillation of tines 302(a–b). In addition, actuation of oscillation of the proof masses 202(a–b) of MEMS gyroscope 200 can be similar to oscillation of the tines 302(a–b), such as electro-static, piezo-electric or electromagnetic. Furthermore, sensing of the Coriolis force within MEMS gyroscope 200 can be piezo-resistive, piezo-electric, or capacitive as well. For instance, the MEMS gyroscope 200 illustrated in FIG. 3A is arranged to capacitively sense a displacement due to the Coriolis force. However, other arrangements are possible as well.

Figure 5:
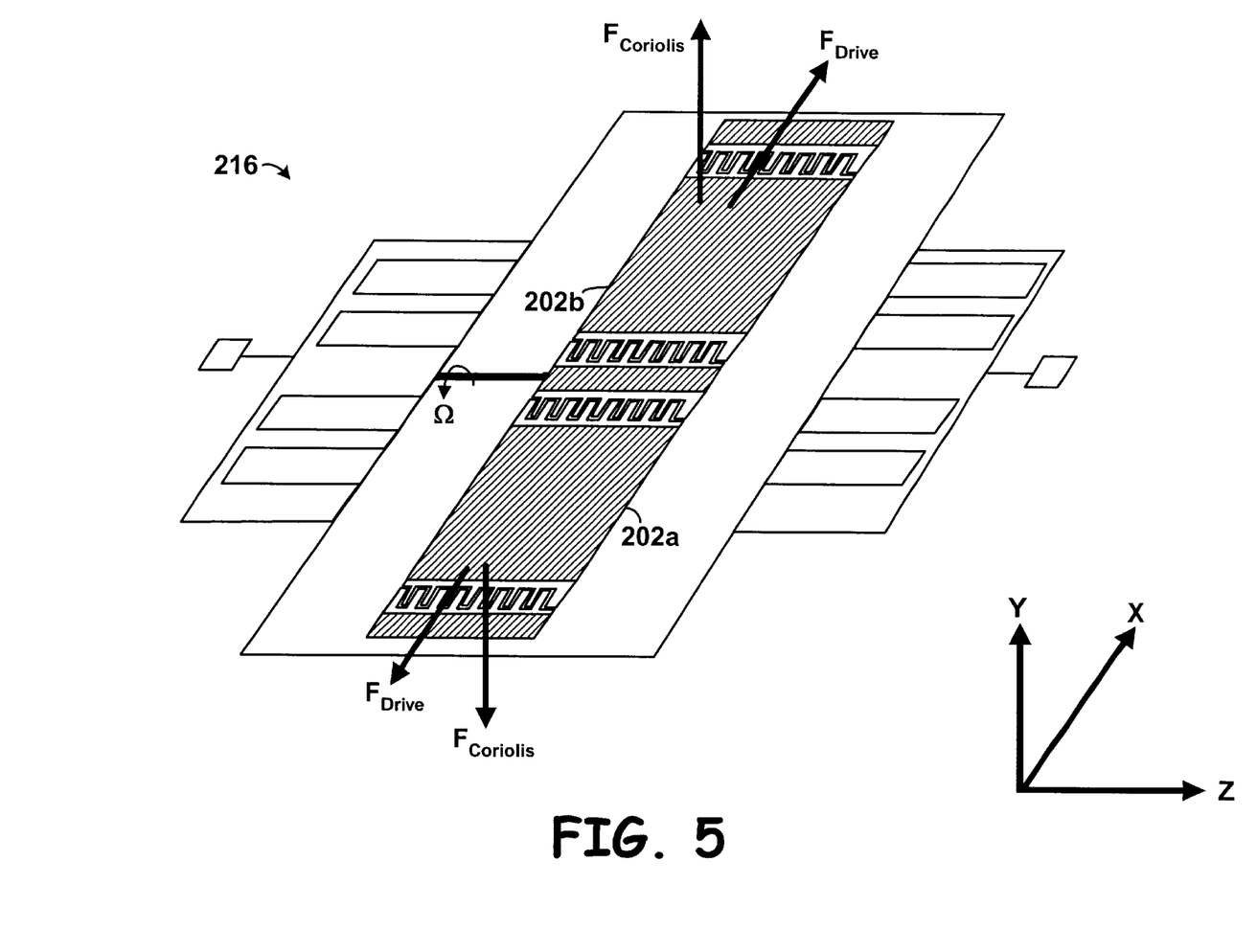
FIG. 5 illustrates the inertial MEMS device of FIG. 2.

FIG. 5 illustrates the TFG 216 of FIG. 3A. FIG. 5 illustrates the angular rotation along the Z-axis (indicated by arrow $\Omega$) detected by the TFG 216. The $F_{Drive}$ arrows indicate the directions that the proof masses 202(a–b) may initially begin oscillating. The proof masses 202(a–b) oscillate back and forth along the X-axis. The $F_{Coriolis}$ arrows indicate the directions of the resulting Coriolis forces on the two proof masses 202(a–b) along the Y-axis.

Figure 6:
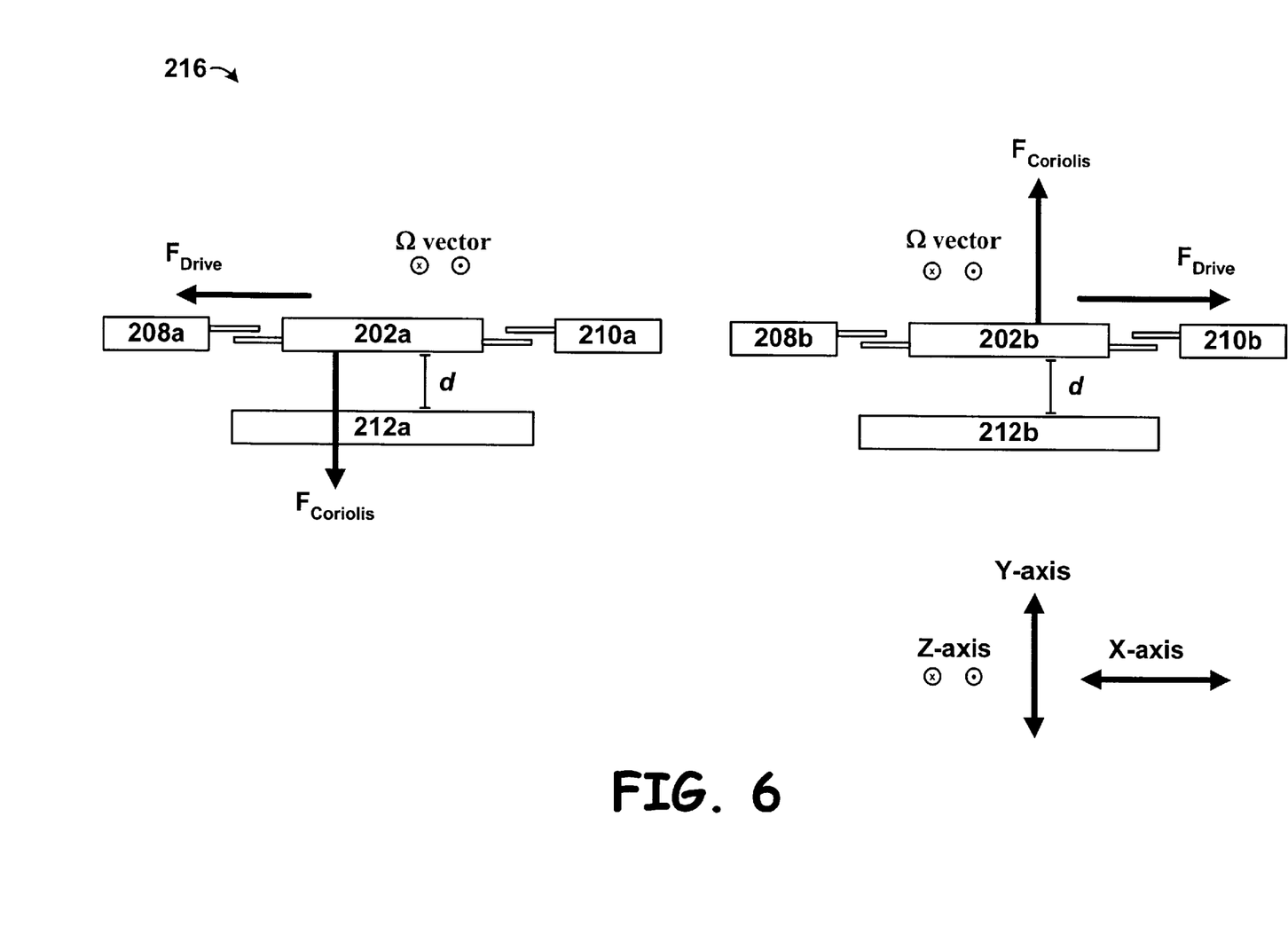
FIG. 6 illustrates a side view of the inertial MEMS device of FIG. 5.

FIG. 6 illustrates a side view of the TFG 216 of FIG. 5. As illustrated, the Coriolis force may be directed along the Y-axis and causes a change in capacitance between the proof masses 202(a–b) and sense plate 212(a–b) capacitors. The amount of change in capacitance can be determined according to the change in distance (illustrated as d) between the proof masses 202(a–b) and sense plates 212(a–b). The capacitance (C) between the proof masses 202(a–b) and sense plates 212(a–b) can be calculated according to Equation 2 (Eq. 2) provided below.

$$C = \frac{\varepsilon_o A}{d} \qquad \text{Eq. 2}$$

Where $\varepsilon_0$ is the vacuum permittivity constant (i.e., $8.85 * 10^{-12}$ $C^2/N^*m^2$), A is the area of capacitance, and d is the distance between the proof masses 202(a–b) and sense plates 212(a–b).

Referring back to FIG. 3A, to start the MEMS gyroscope 200 (i.e., initiate the proof masses 202(a–b) into oscillation), a system power source (not shown) may provide power to the TFG 216. A system power source may be any power source used to power a MEMS. For example, a system power source may be a power source for an avionics system that includes at least one MEMS gyroscope. A system power source may provide power in a range of 5 to 1000 volts, however the MEMS gyroscope 200 is not limited to that range.

The drive electronics 224(a–b) may apply a drive voltage to the motor drive combs 208(a–b) which cause the proof masses 202(a–b) to oscillate. The drive electronics 224(a–b) may lock onto a substantially tuning fork mode frequency of the proof masses 202(a–b) within a period of time. A start time of the MEMS gyroscope 200 may be related to a period of time that the drive electronics 224(a–b) incur to lock onto a tuning fork frequency. Alternatively, for a MEMS gyroscope with a high resonance quality factor (i.e., Q), drive electronics may not be able to find a tuning fork mode frequency and the MEMS gyroscope 200 may oscillate at an approximate tuning fork mode frequency.

With a high Q factor, to improve the start time of the MEMS gyroscope 200, electronic noise may be injected into the drive electronics 224(a–b). The noise may be injected into the drive electronics 224(a–b) after a system power source has been applied to the TFG 216. Once the drive electronics 224(a–b) lock onto a tuning fork frequency, the injection of noise may be discontinued. Injection of noise may be implemented as described within commonly assigned co-pending U.S. patent application Ser. No. 10/092,819 to Platt, and/or a method of improved start time for MEMS gyroscope may be implemented as described within commonly assigned co-pending U.S. patent application Ser. No. 10/114,968, to Platt, the full disclosures of which are incorporated herein entirely by reference and to which the reader is directed for further information. Still other methods of noise injection and/or activation of a MEMS TFG may be used as well.

In one embodiment, at least a portion of the MEMS TFG 100 and the MEMS gyroscope 200 are operated at substantially low temperatures. By operating a portion of a MEMS gyroscope or an entire MEMS gyroscope at low temperatures, such as cryogenic temperatures, the performance may be improved. Cryogenic temperatures may refer to temperatures such as between 0–200 degrees Kelvin, or other temperatures that are substantially low temperatures. Reduced temperatures may improve performance by (i) reducing electronic noise, (ii) reducing Johnson noise, (iii) reducing Seebeck and junction potentials, (iv) increasing control of electro-statics, (v) decreasing drive voltage required, (vi) increasing Quality Factors (Q), (vii) achieving more control of leakage signals, (viii) allowing use of specialized low temperature electronics, and (ix) reducing thermal-mechanical noise (Brownian motion noise). Other improvements may exist as well.

The sense electronics 220 and the pre-amplifier 218 of the MEMS gyroscope 200 illustrated in FIG. 3A may generate electrical noise due to a random thermal motion of electrons and differences in temperatures within the sense electronics 220 and the pre-amplifier 218. The noise may be generated in the electrical connection between the sense electronics 220 and the pre-amplifier 218 by electrical pickup and fluctuating thermoelectric voltages.

By co-locating drive and sense electronics 224(a–b) and 220 and the pre-amplifier 218 within the housing 201 of the MEMS gyroscope 200, or within a close proximity of the TFG 216, and by operating the MEMS gyroscope 200 at substantially low temperatures, electrical noise due to random thermal motion of electrons within the sense electronics 224(a–b) and the pre-amplifier 218 can be substantially decreased. This may be due to a reduced thermal motion of electrons and a reduced difference in temperatures within electronics of the MEMS gyroscope 200. Thus, one integral package, or two packages in close proximity and electrically connected, may include both gyroscope means and sensing means. In addition, more than one gyroscope may be provided within the MEMS gyroscope 200.

In one embodiment, low temperatures refer to cryogenic temperatures, such as approximately 200 degrees Kelvin or below. Substantially low temperatures may also refer to a range of temperatures, such as between approximately 0 degrees Kelvin and approximately 150 degrees Kelvin. Johnson noise within the MEMS gyroscope 200 may also be reduced due to operation of the MEMS gyroscope 200 at 150 degrees Kelvin. In addition, Seebeck noise may be reduced and/or eliminated since little or no temperature difference may be present within the MEMS gyroscope 200.

The pre-amplifier 218 of the MEMS gyroscope 200 may inherently generate electrical is noise. The electrical noise may be due to Johnson noise in a feedback resistor and/or Brownian motion noise due to signals from the proof masses 202(a–b). Electrical noise within a MEMS gyroscope can be measured by angular random walk (ARW, in deg/sqrt (hour)). ARW can be determined using Equation 3 (Eq. 3) provided below.

$$ARW = \left(\frac{V_n}{SF}\right) \times K \qquad \text{Eq. 3}$$

Where: $V_n$ is Voltage noise in Volts/rt(Hz) at pre-amp output;

SF is Scale Factor in Volts/deg/sec; and

K is a constant.

A cryogenic MEMS gyroscope may reduce ARW by reducing pre-amplifier noise and Johnson noise by operating at low temperatures. Additionally, ARW specifically due to Brownian motion in a MEMS gyroscope can be determined using Equation 4 (Eq. 4) provided below.

$$ARW = \left(\frac{k_B T \omega_{sense}}{m Q_{sense} x_{drive}^2 \omega_{drive}^2}\right)^{1/2} \frac{360}{2\pi} \times K \deg/rt(hr) \qquad \text{Eq 4}$$

Where: $k_B$ is Boltzmann's constant;

T is temperature;

$\omega_{sense}$ is resonant angular frequency of the sense mode;

m is mass;

$Q_{sense}$ is quality factor of the sense mode;

$x_{drive}$ is the amplitude of electrostatically driven motion along the X-axis;

$\omega_{drive}$ is resonant angular frequency of the drive mode; and

K is a constant.

Electrical noise generated due to Brownian motion may be the noise limit within inertial sensors.

Brownian motion may be caused by any mechanical dissipation (i.e., viscous drag, thermoelastic damping, internal damping, internal friction, etc.). Brownian motion noise is present in substantially all operation of MEMS gyroscopes. However, the ARW due to Brownian motion noise may be reduced by operating at low temperatures.

Operating a MEMS at cryogenic temperatures may also provide greater mechanical and thermal stability. The MEMS TFG 100 and the MEMS gyroscope 200 may include silicon (Si) bonded onto a pyrex material and/or silicon bonded onto silicon with electrical isolation provided. Thin metal films may also be used as well. Performance of the MEMS TFG 100 and the MEMS gyroscope 200 may be improved at low temperatures due to desirable mechanical properties of silicon and pyrex. In addition, Young's modulus may remain stable at low temperatures and differential thermal contraction may not impair operation of the MEMS.

In addition, operating an inertial MEMS device at cryogenic temperatures results in a higher mechanical quality factor (Q) resulting in improved sensor output stability. The Q factor is a measure of the sharpness of resonance or frequency selectivity of a resonant mode. The mechanical Q factor of the MEMS TFG 100 and/or the MEMS gyroscope 200 can be affected by thermoelastic damping (TED). The mechanical Q factor due to thermoelastic damping of the MEMS TFG 100 may be determined using Equation 5 (Eq. 5) and Equation 6 (Eq. 6) provided below.

$$Q = \frac{\rho C_p}{\alpha^2 TE} \left[\frac{1 + \left(\frac{f}{F_o}\right)^2}{\left(\frac{f}{F_o}\right)}\right] \qquad \text{Eq. 5}$$

$$F_o = \frac{\pi \kappa}{2 \rho C_p t^2} \qquad \text{Eq. 6}$$

Where: $F_0$ is thermal dissipation frequency;

f is resonant frequency;

$\rho$ is mass density;

$C_p$ is specific heat at constant pressure;

$\alpha$ is thermal coefficient of expansion;

T is temperature in Kelvin;

t is suspension beam width in the direction of oscillation;

$\kappa$ is thermal conductivity; and

E is Young's Modulus.

According to Eq. 5, operating at low temperatures typically results in a high Q factor for a MEMS. This is due to the product $\alpha^2 T$ becoming smaller at a low temperature, resulting in a higher Q, as shown by Eq. 5. This effect is especially pronounced in silicon, which has zero coefficient of thermal expansion at about 120 to 130 degrees Kelvin. At this temperature, mechanisms other than thermoelastic damping will determine the Q. In many pure materials, the thermal conductivity increases as the temperature is lowered, reaching a maximum typically near 20 to 100 degrees Kelvin. This effect can result in lower Q in these materials, as shown by equations 5 and 6. However, in heavily doped silicon, which is typically used in MEMS gyroscopes, the thermal conductivity changes very little with temperature, except for a sharp decrease below 100 degrees Kelvin.

Accordingly, since the thermal coefficient of expansion is small at low temperatures, the Q factor will be high at low temperatures. Therefore, according to Eq. 5, operating at low temperatures results in a high Q factor for a MEMS. For a more complete understanding of the mechanical Q factor, reference is made to "The Effect of Thermoelastic Internal Friction on the Q of Micromachined Silicon Resonators," T. V. Roszhart, in Proceedings for the Solid-State Sensor and Actuator Workshop, Hilton Head, South Carolina; (IEEE, New York 1990) pg. 13.

Higher Q factors may result in improved operation of a MEMS gyroscope. For example, a MEMS gyroscope having sense plates comprised of B-doped (boron-doped) silicon operating at a resonant frequency of 10 kHz may have a Q factor of approximately 1,000,000 at 130 degrees Kelvin and in comparison, the MEMS gyroscope may have a Q factor of approximately 250,000 at 300 degrees Kelvin. Therefore, operating at low temperatures may improve sharpness of output signals of the MEMS TFG 100. Additionally, as another example, a pure silicon resonator operating at 10 kHz may have a Q factor of approximately $2 \times 10^9$ at 3.5 degrees Kelvin, which illustrates a desired improvement of the sharpness of the output signals.

In one embodiment, high temperature super conducting (HTSC) materials may be used in the MEMS TFG 100 and the MEMS gyroscope 200. For example, super conducting materials may be used by operating the MEMS TFG 100 at temperatures below the transition temperature (i.e., possibly near about 77 degrees Kelvin or lower) of the superconducting material. Below the superconducting transition temperature, a superconducting material will transition from a normal state, (i.e., electrical resistance is present) to a super conducting state (i.e., there is little or no resistance to the flow of direct electrical current). Super conducting materials such as $Hg_2Ba_2Ca_2Cu_3O_x$, operable to superconduct at about 130 degrees Kelvin, $YBa_2Cu_3O_x$, operable to superconduct at about 92 degrees Kelvin, and $MgB_2$, operable to superconduct at about 39 degrees Kelvin are examples of HTSC materials that may be used within MEMS TFG 100 and MEMS gyroscope 200. However, other HTSC materials may be used as well.

In one embodiment, the pre-amplifier 218 of the MEMS gyroscope 200 includes super conducting materials. For example, the pre-amplifier 218 may be a SQUID Amp as illustrated in FIG. 3C. The SQUID Amp 260 may be used within the MEMS gyroscope 200 when operating the TFG 216 below the super conducting transition temperature.

Other materials may be used within the MEMS TFG 100 and the MEMS gyroscope 200. For example, cryogenic electronics, such as a low temperature junction field effect transistor (JFET), like JFET part number NJ132L from InterFET Corporation of Garland, Tex. or others from Moxtek, Inc. in Orem, Utah may be used within the MEMS gyroscope 200, in particular within the sense electronics 220, the drive electronics 224(a–b) or within other elements of the MEMS gyroscope 200. In addition, cryogenic electronics and super conducting materials may both be employed within the MEMS TFG 100 or the MEMS gyroscope 200.

In addition, thermoelectric cooling can be employed to operate an inertial MEMS device and its associated electronics at cryogenic temperatures. Thermoelectric cooling may involve solid-state heat pumps that operate on the Peltier effect (i.e., heating or cooling is produced when electric current passes through two conductors).

Employing super conducting materials within MEMS TFG 100 and MEMS gyroscope 200 may increase control of electric fields due to electro-static charges within the elements. This results from the fact that a super conducting material provides zero resistance for direct current (DC), and extremely low resistance to currents at frequencies typically used in MEMS devices, e.g. frequencies less than a few MHz.

In addition, when an electrical conductor enters a superconducting state, the electrical conductor expels substantially all magnetic fields. As a result, little or no magnetic fields may be present within the MEMS TFG 100. This may result in improved device performance of the MEMS TFG 100 in the presence of externally applied magnetic fields, and in reduction of voltages induced by stray magnetic fields produced by electrical currents within the MEMS device. The thin metal films typically used for electrical shielding and ground planes in MEMS devices at ambient temperature do not provide substantial magnetic shielding.

Enabling operation of the MEMS gyroscope 200 illustrated in FIG. 3A at low temperatures while co-locating the TFG 216 with the pre-amplifier 218 in close proximity or within the same housing 201 allows for the MEMS gyroscope 200 to be used in applications not believed to have been previously contemplated. For example, the MEMS gyroscope 200 can be used within satellites in outer space to provide attitude control and/or control of the position in space of a spacecraft. The MEMS gyroscope 200 can stabilize a satellite's attitude in orbit by determining a satellites rotational angular velocity and compensating to adjust the rotation. As another example, the MEMS gyroscope 200 can be used in precision satellite navigation and pointing and inertial navigation systems within defense, avionics, and/or space applications. For instance, in one embodiment, the MEMS gyroscope 200 is an inertial navigation system. Additionally, in another embodiment, the MEMS gyroscope 200 is an inertial sensor within an inertial navigation system. Additional low temperature applications of the MEMS gyroscope 200 may include submarine navigation, global positioning system (GPS) base stations, and uses within other commercial navigation units.

While a MEMS TFG is used/employed to illustrate embodiments of the invention, the present invention is not limited to use of a MEMS TFG. Other MEMS inertial devices may be used as well. For example, MEMS gyroscopes such as MEMS torsional, vibratory, or resonator gyroscopes can be used as well. In one application, a MEMS torsional gyroscope may include a torsional flexure structure, which constrains motion to a rotation about a single axis. In addition, a cryogenic MEMS accelerometer that uses a capacitance change due to an acceleration force to determine an acceleration parameter may be used. Additional accelerometers may also be used as well.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description. Consequently, while the present invention has been described with reference to particular embodiments, modifications of structure, sequence, materials and the like apparent to those skilled in the art would still fall within the scope of the invention.

We claim:

1. A Micro-Electro-Mechanical-System (MEMS) comprising:
    a housing;
    a cryogenic inertial MEMS device arranged within the housing, the cryogenic inertial MEMS device operable to detect a change in an angular rate of motion; and
    an amplifier coupled to the cryogenic inertial MEMS device and located within a close proximity of the housing,
    thereby enabling the cryogenic inertial MEMS device to operate at cryogenic temperatures.

2. The MEMS of claim 1, wherein the amplifier and the cryogenic inertial MEMS device are both located within the housing.

3. The MEMS of claim 1, wherein one of the amplifier and the cryogenic inertial MEMS device is located within the housing and the other of the amplifier and the cryogenic inertial MEMS device is located within a second housing.

4. The MEMS of claim 1, wherein the cryogenic temperatures are at most about 200 degrees Kelvin.

5. The MEMS of claim 1, wherein the cryogenic inertial MEMS device comprises super conducting materials.

6. The MEMS of claim 1, wherein the cryogenic inertial MEMS device comprises cryogenic electronics.

7. The MEMS of claim 1, wherein the cryogenic inertial MEMS device comprises super conducting materials and cryogenic electronics.

8. The MEMS of claim 1, wherein the cryogenic inertial MEMS device is selected from the group consisting of a MEMS vibratory gyroscope, a MEMS accelerometer, a MEMS tuning fork gyroscope and a MEMS torsional gyroscope.

9. The MEMS of claim 1, wherein the amplifier is a super conducting quantum interference device amplifier (SQUID).

10. A cryogenic inertial Micro-Electric-Mechanical-System (MEMS) device operating at a cryogenic temperature.

11. The cryogenic inertial MEMS device of claim 10, wherein the device comprises cryogenic electronics.

12. The cryogenic inertial MEMS device of claim 10, wherein the device comprises super conducting materials.

13. The cryogenic inertial MEMS device of claim 10, wherein the device comprises super conducting materials and cryogenic electronics.

14. The cryogenic inertial MEMS device of claim 10, wherein the device further comprises a super conducting quantum interference device amplifier (SQUID).

15. The cryogenic inertial MEMS device of claim 10, wherein the device is maintained at the cryogenic temperature using thermoelectric cooling.

16. The cryogenic inertial MEMS device of claim 10, wherein the cryogenic temperature is at most about 200 degrees Kelvin.

17. The cryogenic inertial MEMS device of claim 10, wherein the device is operated in outer space.

18. The cryogenic inertial MEMS device of claim 10, wherein the device is selected from the group consisting of a MEMS vibratory gyroscope, a MEMS accelerometer, a MEMS tuning fork gyroscope, and a MEMS torsional gyroscope.

19. A method comprising operating an inertial Micro-Electro-Mechanical System (MEMS) device at a cryogenic temperature.

20. The method of claim 19, wherein operating the inertial MEMS device at the cryogenic temperature comprises providing the inertial MEMS device comprised of cryogenic electronics.

21. The method of claim 19, wherein operating the inertial MEMS device at the cryogenic temperature comprises providing the inertial MEMS device comprised of super conducting materials.

22. The method of claim 19, wherein operating the inertial MEMS device at the cryogenic temperature comprises providing the inertial MEMS device comprised of super conducting materials and cryogenic electronics.

23. The method of claim 19 further comprising thermoelectrically cooling the inertial MEMS device to maintain the cryogenic temperature.

24. A method of sensing an angular rate of motion comprising operating an inertial Micro-Electro-Mechanical System (MEMS) device at a cryogenic temperature.

25. The method of claim 24, wherein operating the inertial MEMS device at the cryogenic temperature, the device is maintained at the cryogenic temperature using thermoelectric cooling.

26. The method of claim 24, wherein operating the inertial MEMS device at the cryogenic temperature, the device is operated in outer space.

27. The method of claim 24, wherein operating the inertial MEMS device at the cryogenic temperature comprises operating the inertial MEMS device at a temperature of at most about 200 degrees Kelvin.

28. The method of claim 24, wherein operating the inertial MEMS device at the cryogenic temperature comprises providing the inertial MEMS device comprised of cryogenic electronics.

29. The method of claim 24, wherein operating the inertial MEMS device at the cryogenic temperature comprises providing the inertial MEMS device comprised of super conducting materials.

30. The method of claim 24, wherein operating the inertial MEMS device at the cryogenic temperature comprises providing the inertial MEMS device comprised of super conducting materials and cryogenic electronics.

31. The method of claim 24, wherein operating the inertial MEMS device at the cryogenic temperature comprises:
    capacitively coupling at least one proof mass to at least one sense plate;
    oscillating the at least one proof mass horizontally along a first oscillation axis; and
    detecting a change in the oscillation of the at least one proof mass, wherein the change in the oscillation of the at least one proof mass occurs along a second oscillation axis,
    wherein the change in the oscillation of the at least one proof mass results from a Coriolis force applied to the inertial MEMS device, wherein the Coriolis force is applied along a third axis, and
    wherein the change in the oscillation of the at least one proof mass results in a change in capacitance between the at least one proof mass and the at least one sense plate.

32. A method comprising:
    providing a housing;
    providing an inertial Micro-Electro-Mechanical-System (MEMS) device coupled to a pre-amplifier;
    co-locating the inertial MEMS device and the pre-amplifier within a close proximity of the housing; and
    operating the inertial MEMS device and the pre-amplifier at cryogenic temperatures.

33. The method of claim 32, wherein providing the inertial MEMS device comprises providing a device selected from the group consisting of a MEMS vibratory gyroscope, a MEMS accelerometer, a MEMS tuning fork gyroscope, and a MEMS torsional gyroscope.

34. The method of claim 32, wherein providing the inertial MEMS device comprises providing the inertial MEMS device comprised of super conducting materials.

35. The method of claim 32, wherein providing the inertial MEMS device comprises providing the inertial MEMS device comprised of cryogenic electronics.

36. The method of claim 32, wherein providing the inertial MEMS device comprises providing the inertial MEMS device comprised of super conducting materials and cryogenic electronics.

37. The method of claim 32, wherein providing the inertial MEMS device coupled to the pre-amplifier comprises coupling the inertial MEMS device to a super conducting quantum interference device amplifier (SQUID).

38. The method of claim 32, wherein co-locating the inertial MEMS device and the pre-amplifier within the close proximity of the housing comprises arranging the inertial MEMS device and the pre-amplifier to be within the housing.

39. The method of claim 32, wherein co-locating the inertial MEMS device and the pre-amplifier within the close proximity of the housing comprises arranging one of the inertial MEMS device and the pre-amplifier to be within the housing and arranging the other of the inertial MEMS device and the pre-amplifier to be within a separate housing.

* * * * *